March 5, 1935. F. O'NEILL 1,992,963
GLASS GATHERING AND FORMING MACHINE
Filed April 3, 1926 8 Sheets-Sheet 1

Patented Mar. 5, 1935

1,992,963

UNITED STATES PATENT OFFICE

1,992,963

GLASS GATHERING AND FORMING MACHINE

Frank O'Neill, Toledo, Ohio, assignor, by mesne assignments, to Owens-Illinois Glass Company, Toledo, Ohio, a corporation of Ohio Application April 3, 1926, Serial No. 99,479

55 Claims. (Cl. 49—5)

This invention relates to gathering molten glass and forming into articles, as hollow ware.

This invention has utility when incorporated in a suction gather press and blow apparatus. As herein disclosed, there is a stationary tank exposing upwardly a pool of molten glass. The provision of the machine proper involves two columns, one for the first or gather and preliminary forming referred to as the blank table or column, and the other as the finish or blow table or column, which receives the blank from the first table, completes the blowing operation, and delivers the completed article for annealing. The blank molds are in an annular series involving a lower or main pair of hinge sections open at the bottom. Each blank mold is carried on a crosshead which, besides having the travel about the column in an endless-orbit, has vertical movement to bring the open bottom of the blank mold into proximity with the molten glass pool. There is a maintained circulation of the molten glass in the pool to avoid freezing or chilling interference in the gather. This main blank mold has its open bottom closed after the suction gather in drawing the glass up into such mold, and the attenuation cut therefrom to fall back in the tank or pool. The upper end of this suction gathered blank has the plunger withdrawn therefrom and the blank distended into the blank mold by pressure flow in completing the formation of the blank. This upper portion of the blank is equipped with a neck finish mold section radially reciprocable on the side toward the blow table, there to deliver the formed blank from the opened blank mold sections into a finish mold as closing about such blank, at which time the neck mold finish is open and then retracted. The delivered blank into the blow mold is then further distended, the blow mold opened, and the blow mold bottom depressed or lowered to tilt the finished ware away from and out of the opened blow mold in discharging such from the machine.

A material factor in the operation of this machine is the rapidity with which the ware may be produced, and the showing specifically is for continuous operation. As herein embodied, there is maximum time interval consumed at the transfer. To minimize such as governing the total output of the machine, there may be a speeding up of the machine and the operation of the machine drive may be intermittent as shown in applicant's Patent No. 1,551,526 of August 25, 1925. Under these circumstances, the station stop permits the transfer functions to be completed, and the interval may be a minimum only for the recover stroke in the reciprocating drive for the carriers.

Referring to the drawings:

Fig. 1 is a plan view, with parts broken away, of an embodiment of the invention in connection with a gather device press and blow two table or carrier glass machine;

Fig. 18 is a diagrammatic view of the sequence of operations for the machine as to the two carriers or tables;

*Main drive*

Figure 2:
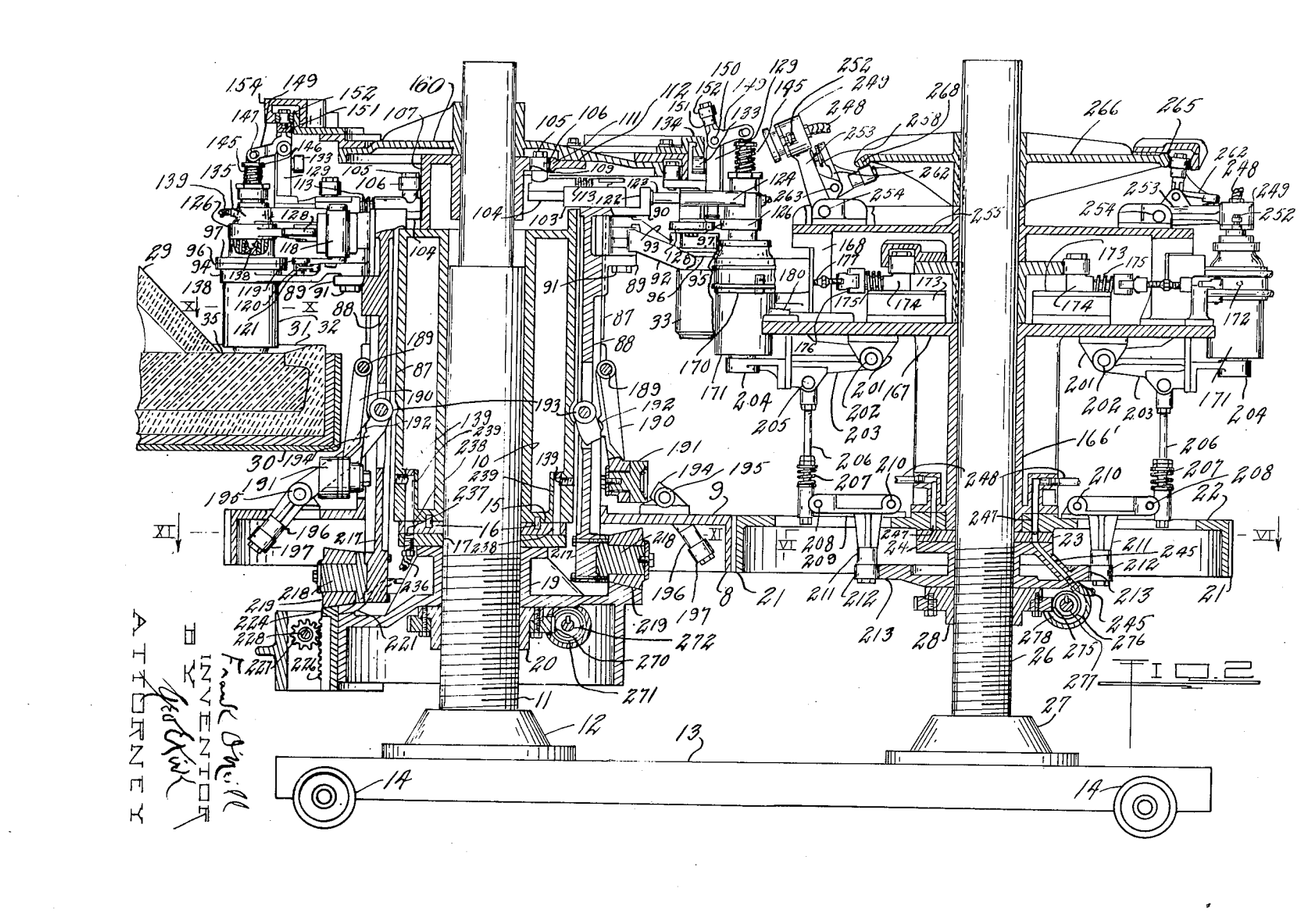
Fig. 2 is a section on the line II—II, Fig. 1.

Motor 1 is shown as having variable speed transmission box 2 for controlling rotation of drive shaft 3 having worm 4 (Fig. 1) in mesh with worm wheel 5 on shaft 6 driving gear 7 in mesh with gear 8 as the large main drive gear having web or table portion 9 fixed with sleeve 10 about column 11 mounted on base 12 carried by platform 13 mounted on rollers 14 (Fig. 2). This sleeve 10 is mounted on supporting plate 15 and connected thereto by dowels 16 over plate 17 and connected by key 18 (Fig. 11) to be fixed against rotation as to the column 11 and sustained by ring member 19 held in position by threaded sleeve 20 on the column 11 (Fig. 2).

This blank carrier or table 9 has its direction of rotation counterclockwise, and its toothed portion 8 is directly in mesh with toothed portion 21 having web 22 (Figs. 1, 2, 16) serving as the blow table carrier. This web 22 is sustained on plate 23, as a bearing, riding upon collar 24 with which it is connected against rotation by key 25 (Fig. 6) assembling such plate 23 and collar 24 against rotation as to column 26 mounted on base 27. This collar 24 is sustained by threaded member 28 having direct coaction with this second column 26.

Gather

Figure 7:
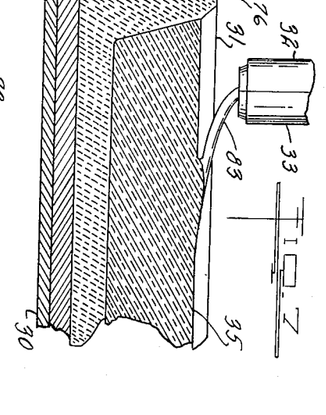
Fig. 7 is a side elevation of the shear as cooperating with the gather, parts being broken away.
Figure 8:
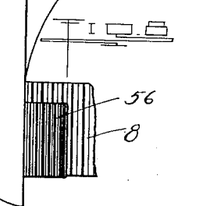
Fig. 8 is a fragmentary view of the shear from the left of Fig. 7.
Figure 9:
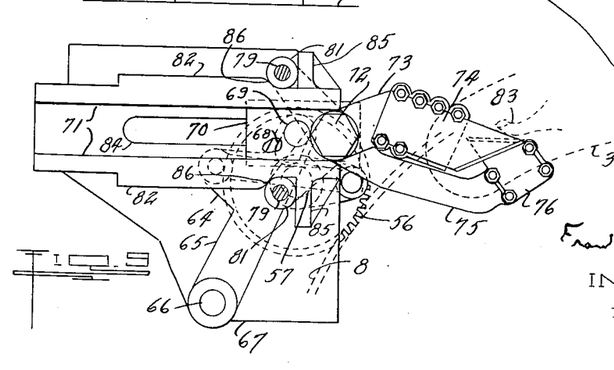
Fig. 9 is a plan view of the shear of Fig. 7 as in shearing completing position.

Glass tank 29 has forehearth or overhanging boot 30 (Figs. 1, 2, 7). This forehearth has in its upper portion elongated opening 31 on an arc preferably on the axis of the column 11 of the first table or turret. In the rotation of the blank table 9, blank mold main sections 32, 33, are closed and have open bottom 34 brought into proximity with surface 35 of the pool of molten glass in the boot 30. This closed blank mold 32, 33, with open bottom 34, (Fig. 14) has such open bottom 34 skim along approximately at the surface of the molten glass and then rise therefrom in leaving the region of the forehearth 30.

Molten glass circulator

The contact of this molten glass surface with the traveling mold has a tendency to create a chill region in the forehearth 30, and there is provision herein of a molten glass circulating means to cause a current or flow of the molten glass about the forehearth. To this end, motor 36 has connection through bevel gears 37 for driving shaft 38 having splined thereon (Fig. 3) coupling 39 in housing 40. This coupling 39 is normally urged by spring 41 as held by adjustable collar 42 for maintaining this coupling 39 yieldably in driving mesh with companion toothed coupling member 43 fast on shaft 44 as carrying worm 45 in mesh with worm wheel 46 mounted on horizontal shaft 47 adjacent the side of the forehearth 30. This worm wheel 46 is accordingly continuously rotating, but its crank 48, as engaging fork 49, rocks such fork as depending from rock shaft 50 fast with such fork 49. This rock shaft 50 is rockably mounted in block 51, as a crosshead, carried by upwardly extending guides 52. Stop or bearing, as riding on guide 52, determines the extent of descent of this crosshead 51.

Figures 3, 4, 5, 6:
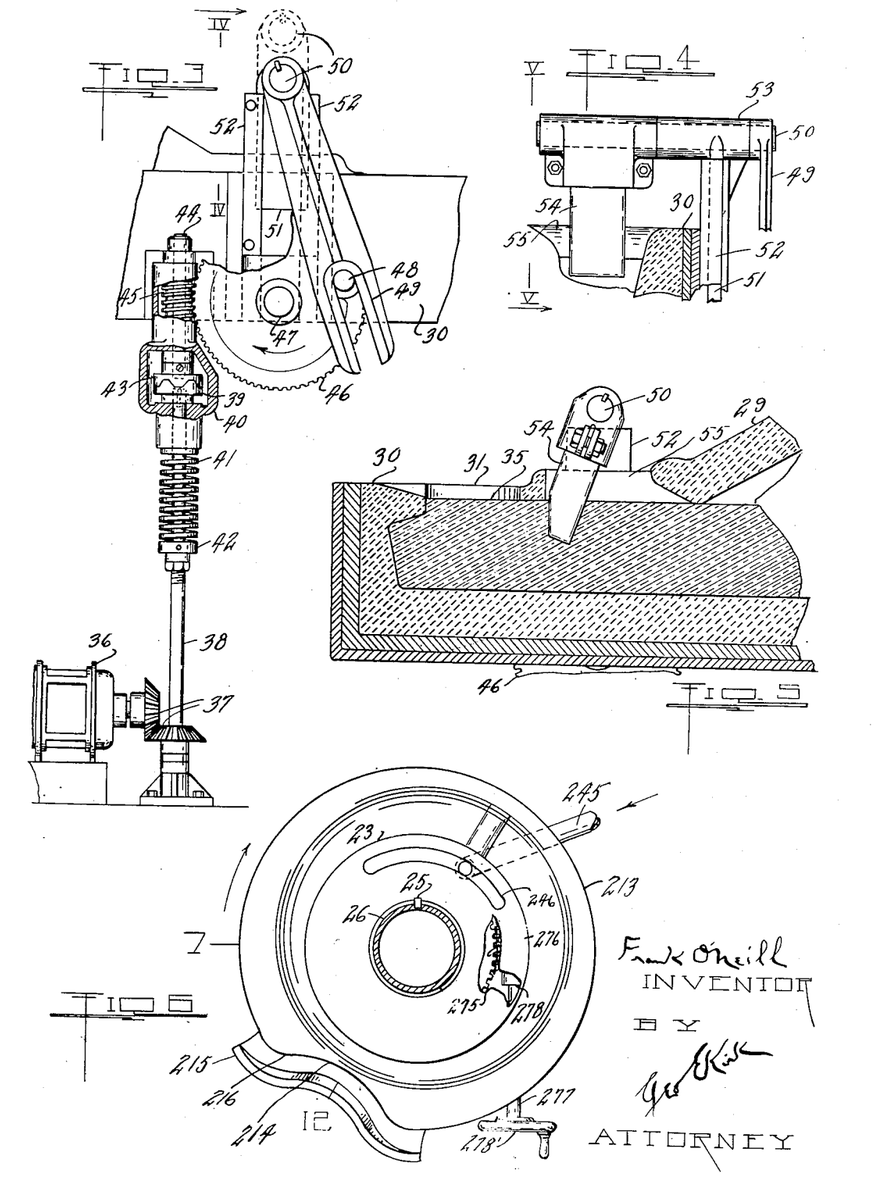
Fig. 3 is a side elevation, parts being broken away, of the circulating means for the molten glass in the forehearth of the furnace near where the gather occurs.
Fig. 4 is a partial section on the line IV—IV, Fig. 3, looking in the direction of the arrows.
Fig. 5 is a partial section on the line V—V, Fig. 4 looking in the direction of the arrow.
Fig. 6 is a section on the line VI—VI, Fig. 2, looking in the direction of the arrow, parts being broken away.

In the rotation of this worm wheel 46, clockwise, with the crank pin 48 starting adjacent the worm 45, this pin 48 in the fork 49, has a lifting action to raise the crosshead 51 in the guide 52 together with stop 53. This not only lifts the shaft 50, but paddle 54 fixed with such shaft and extending through opening 55 in the upper portion of the forehearth 30. This lifting action, is of such extent to clear the paddle 54 from the surface 35 of the molten glass, and then, in the continuation of this rotation of the pin 48, swing such paddle 54 toward the line extended of the arc 31. As this swing toward the line of the gather opening 31 is completed, the descent of the pin 48 allows the crosshead 51 and stop 53 to settle to the guide 52 as the paddle 54 descends into the pool of the glass in the forehearth 30. From the position of the pin 48, remote from the worm wheel 45, and in this clockwise rotation, this pin 48 moves toward the open end of the fork 49, but not clear thereof so that there is a working oscillation of the shaft 50 with the paddle 54 in the glass for drawing the glass away from the line extended or the region of the line of the gather opening 31 to cause such glass to move or flow into the portion 29 of the main tank, there to be reheated and circulated back into the forehearth as uniform character molten glass.

Should there be any rigid resistance to this normal action of this paddle, the yieldable coupling 39, 43, allows slippage without damage to the equipment or driving motor. This continuous driving of the paddle 54 is a material factor for maintaining a continuous circulation of this molten glass away from the forehearth gather opening, and, accordingly, is a material factor for the flow of freshly molten glass from back in the tank toward this forehearth opening 31.

The shear

The blank table 9 has its toothed portion 8 in mesh with pinion 56 mounted on shaft 57 carried by bearings 58, 59, of bracket 60 mounted on the truck platform 13. This shaft 57 (Fig. 7) as protruding above the bearing 58, carries a crank 61 from which extends links 62 to pin 63 on offset 64 of lever 65 (Figs. 1, 7, 8, 9) mounted on fixed pin 66 carried by extension 67 from the bracket 60. This lever 65, has slot 68 with which engages pin 69 carried by crosshead 70 reciprocable in horizontal guides 71 carried by the bracket 60. This crosshead 70 carries pin 72 upon which is mounted the pair of shear levers. Shear lever 73 carries upper blade 74 of the shear. Companion shear lever 75 carries lower blade 76. These shear levers 73, 75, have extensions 77, 78, carrying upstanding pins 79 connected by tension helical spring 80. These pins 79, as extending through the lever arms 77, 78, respectively carry rollers 81 riding along guide ways 82 as the crank 61 swings and is effective through link 62 for causing the lever 65 to operate the crosshead 70 toward the forehearth 30 and away therefrom. In this movement toward the forehearth as approaching the blank mold rising from the forehearth with a gather of glass therein, the shear blades 74, 76, snap together to sever attenuation 83 as depending from the gather of glass in the blank mold in close proximity to such blank mold. This action of the shears further is one of shifting this attentuation laterally of the gather opening region 31 for the lower shear blade 76 in striking this attenuation 83 tends to work such toward the paddle 54, which paddle 54 is a means for accentuating this drawing off of the somewhat chilled glass, and working such back into the tank or furnace region for re-heating. The actual shear operation occurs as the actuating pin 69 in traveling along slot 84, through the guides 71, approaches stops 85 where the rollers 81 are drawn by the spring 80 into portions 86, thus effecting a quick snapping action in the closing of the shear blades 74, 76, into slightly overlapping position in effecting the glass severing. The continuation of the rotation of the shaft 57 at once retracts the shear blades 74, 76, at a speed to get away from the blank mold and have such ready for a repetition of this cycle of operations even during the continuous operation of the carrier 9, as carrying an endless series of blank molds. The length of this slide for the crosshead 70 is one giving quite a range of travel. The position of the actuating shaft 57, with the link and leverage connection therefrom, is a variable lineal travel drive for the crosshead 70, giving such a quick withdrawal and quick speeding up positions with the shearing action directly, instantaneously, and against any drawing tendency as to the molten glass thereabove in the gather of the blank mold. The quick forward and retrieving action allows ample clearance as to the continuation of the travel of the blank mold, as well as a quick approach to the approximate position of rest at the snapping off of the attenuation 83.

The blank mold carrier

Figures 14, 15, 16, 17:
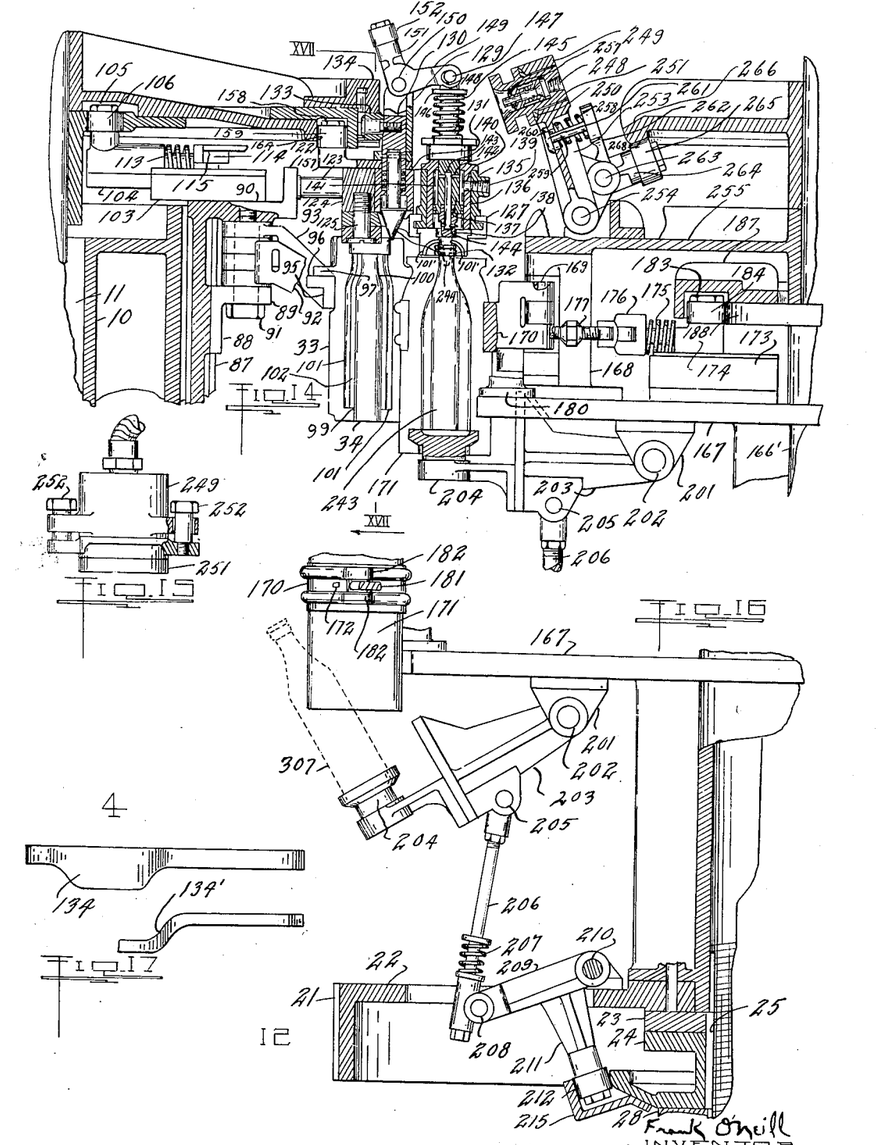
Fig. 14 is a partial view, on an enlarged scale, on the line XIV—XIV, Fig. 1, showing the transfer.
Fig. 15 is a side elevation of the blow head.
Fig. 16 is a partial view on the line XVI—XVI, Fig. 1.
Fig. 17 is a view from the line XVII—XVII, Fig. 14, looking into the neck finish mold opening cam.

Blank mold table or carrier 9 about the column 11 and extending axially of said column has an annular series of guides 87, in each of which is mounted a crosshead 88 (Figs. 1, 2, 14). Each crosshead 88, near its upper portion, has outwardly extending brackets 89, 90, carrying vertically extending pivot pin 91 therebetween, as a hinge pin for arms 92, 93, carrying holder sections 94, 95. These holder sections 94, 95, are provided with flanges 96 abutted by flanges 97 carried by the respective blank mold sections 32, 33, and assembled therewith by bolts 98.

The blank molds 32, 33, comprise opposing semi-cylindrical portions 99 having reduced upper portions 100. The opposing faces of these blank mold sections 32, 33, have semi-ducts 101 (Figs. 10, 14) registering with each other, as the sections 32, 33, are in closed position and at such position have slot connections 102 with the main blank forming mold portions 99, 100. This slot 102 is sufficient for gas or air flow as exhausting the blank mold for suction gather, but is sufficiently narrow that at the viscosity of the glass, such glass may not be drawn thereinto to disclose a seam.

Blank mold opening and closing control

The crosshead has on its upper portion, guide 103 (Figs. 1, 2, 14) for crosshead 104 carrying upstanding pin 105 on which is mounted roller 106 riding against cam having long radius portion 107 extending by shorter radius portion 108 to short radius portion 109, and thence by longer radius portion 110 to the long radius portion 107. Between the termini of the long radius portion 107 for this cam, as fixed with the column 11, the varying and shorter radius portions thereof, have opposing outer guide 111 mounted fast with web 112 fixed with the column 11 and opposing the cam 107, 108, 109, 110.

The crosshead 104 has yieldable connection through spring 113 with crossbar 114 from which extends links 115 to arms 116 as actuating rockers for vertical shafts 117 carried by bearings 118 fixed with the crosshead 88, one on each side of the pin 91. These vertical rock shafts 117 at their lower portions, each has an arm 119 connected by link 120, as a toggle, for engagement with pivot pin 121 on a holder 95, or 96. Accordingly, as the roller 106 moves from long radius portion 107 to have the outer flange or cam guide 111 hold such roller against the reduced radius portion 108, there is a drawing of the crossbar 114 toward the column 11 thus effecting a collapsing of the toggle 119, 120 as to each of the blank mold sections for swinging such sections toward the rock shafts 117, in opening the blank mold for the region of the extent of the cam 109. In the increasing radius portion 110 of this cam, the roller 106 is forced radially outward to the portion 107.

Neck finish

The vertically reciprocable crosshead 88, outwardly of the radially reciprocable crosshead 104, is provided with upstanding lug 122 carrying radially extending guide rods 123. This pair of guide rods 123, mounts crosshead 124 having depending pin 125 pivotally mounting pair of neck finish sections 126, 127, as yieldably held in closed position by leaf springs 128. The crosshead 124 is provided with upwardly extending guide 129 for block 130 having spring 131 thrusting the block 130 upwardly to keep wedge 132 lifted. This block 130 carries roller 133 coacting with cam 134 (Figs. 2, 14, 17) to effect sliding of the block 130 downwardly to have the wedge 132 overcome the action of the springs 128, 131, and force the neck finish mold sections 126, 127, away from each other as swingable on the pin 125 in opening such neck finish mold sections. Upon the roller 133 riding clear of depressing action of the cam 134, the springs 128 insure a collapsing of the neck finish mold sections 126, 127, into closed position, at once cam patch 134' lifts the block 130.

Blank mold suck and blow head

Figures 10, 11, 13:
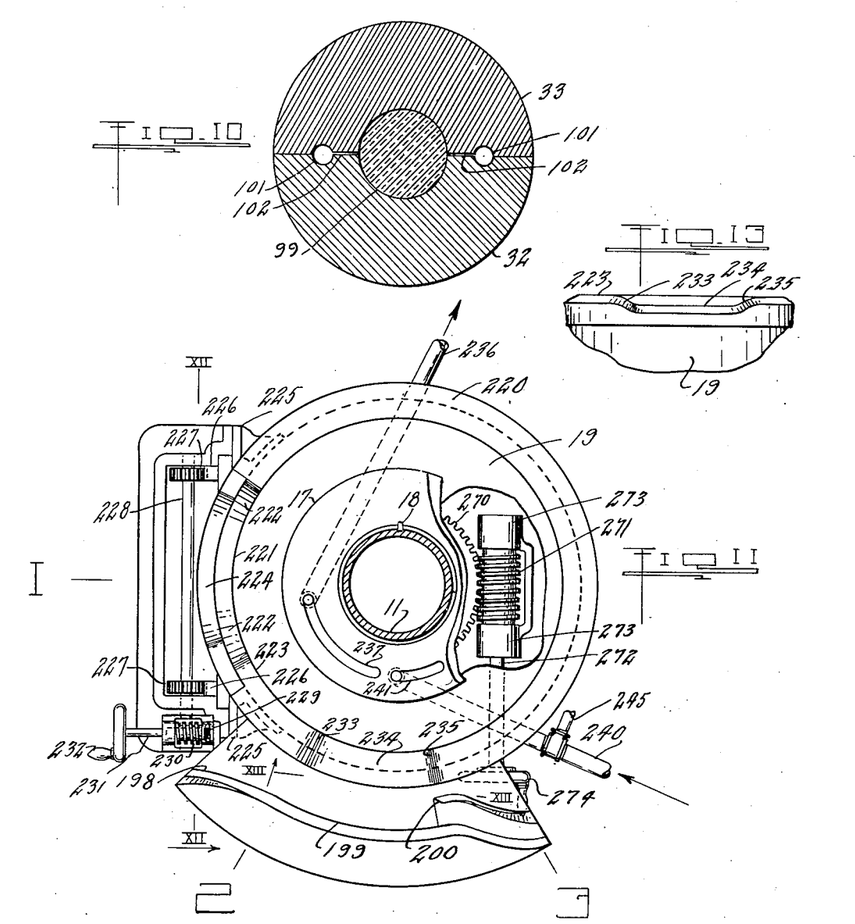
Fig. 10 is a section on the line X—X, Fig. 2.
Fig. 11 is a partial section on the line XI—XI, Fig. 2, parts being broken away.
Fig. 13 is a view of the track cam looking in the direction of the arrow from the line XIII—XIII, Fig. 11.
Figure 10:
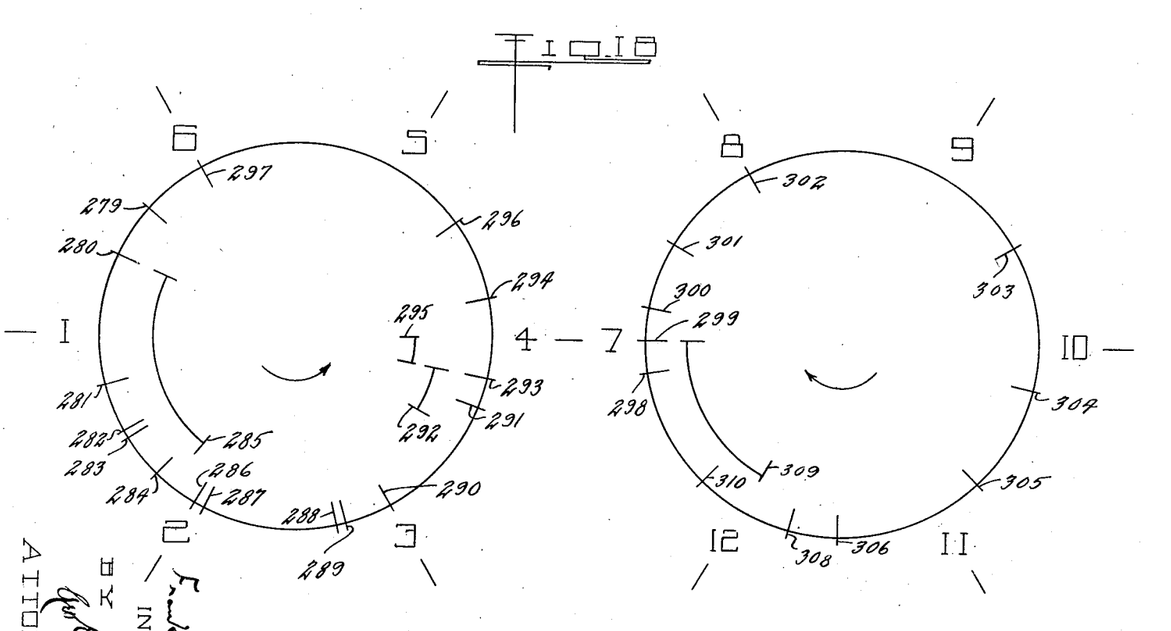

The neck finish crosshead 124 extends beyond the spring 131 to provide socket 135 in which is mounted ported head member 136, as a guide for plunger 137 carrying terminal head or nipple 138. Duct 139 has communication by port 140 with way 141 about the plunger 137, as a sort of equalizing chamber, while from this chamber, ports 142 (Fig. 14) extend to axial duct 143 in the plunger having openings 144 adjacent the nipple 138 in communication by way of neck finish ducts 101' as extending to the ducts 101, and in communication with the cylindrical portions 99 of the blank by the ways 102 (Fig. 10).

The plunger 137 has upward on the head member 136 and resting thereon, spring 145 coacting with collar 146 on such plunger, thus tending to lift such plunger in the head 136. This plunger 137 at its upper portion, opposing the collar 146, carries pin 147 having connection by slot 148 with arm 149 of angle lever having fulcrum bearing 150, (Fig. 14) upwardly of the guide 129 as fixed with the crosshead 124. This arm 149, has at an angle thereto, and fixed therewith, arm 151 carrying roller 152. This roller 152 as riding on cam 153 to cam portion 154 swings the angle lever 151, (Figs. 1, 2) 149, to throw the plunger 137 downward in thrusting the nipple 138 into the blank mold. As the roller 152 rides clear from the cam portion 154, to shorter radius cam portion 155 as guided thereagainst by cam patch 156, the spring 145 assists in allowing the plunger 137 to be drawn upwardly in clearing the nipple 138 from its position in the blank mold and retracting such toward and approximately into the head 136.

Transfer device

The crosshead 124 has fixed therewith bracket 157 (Figs. 1, 2, 14) carrying pin 158 mounting roller 159 approximately clear of coacting with plate portion 160. From this plate portion 160 fixed with the column 11, guide 161 directs this roller 159 into concentric cam portion 162 and thence by radially extending cam portion 163 to intermediate cam portion 164 concentric with the column 26, thence by shorter radius cam portion 165 to cam portion 166 concentric with the column 11, which is connected by clearance portion 167 with the plate 160. As the roller 159 rides in the increasing radius portion 163, the crosshead 124 is thrust radially outward toward the carrier 22, and as to stations on the carrier 22 coacts therewith in a sort of intermeshing gear action, and at the region 164 concentric with the column 26 travels in synchronism and at maintained registry with a companion station on the carrier 22. This gives a time interval for effecting transfer, as by opening the neck finish molds brought about by the depressing of the wedge 132. Thereafter, the travel of the roller 159 in the cam portion 165 retracts the transfer device, and the assembly thereof may be with the closed blank molds as leaving the transfer station.

Blow molds

Fixed with the table 22 is upstanding sleeve 166' (Figs. 1, 2, 14) carrying upper table section 167 having blocks 168 mounting pivot pins 169 for holder pairs 170, swingable toward each other into closing position for blow mold sections 171, as anchored by bolts 172 with the respective holders 170 (Fig. 11). The upper table 167 of the blow mold carrier, has radially extending guides 173 for crossheads 174 having spring connections 175 with crossbars 176 connected by links 177 to arms 178 of vertical rock shafts 179 mounted by brackets 180 fixed with the carrier-table 167. Fixed with the arm 178, as a toggle member, is link 181 connected to ear 182 of the mold holder 170. Upwardly extending from the crosshead 174 is pin 183 carrying roller 184 coacting with long radius cam portion 185 in yieldably holding the blow mold sections closed. As the roller 184 comes to short radius cam portion 186, opposing cam patch 187 is effective for drawing the roller 184 of the crosshead 174 toward the column 26, and thus opening the blow mold. From this shortening radius portion 186, there is increasing radius portion 188 of this cam effecting through the spring 175 a yieldable closing of this blow mold.

Blank mold baffle or bottom closure

Figures 19, 20:
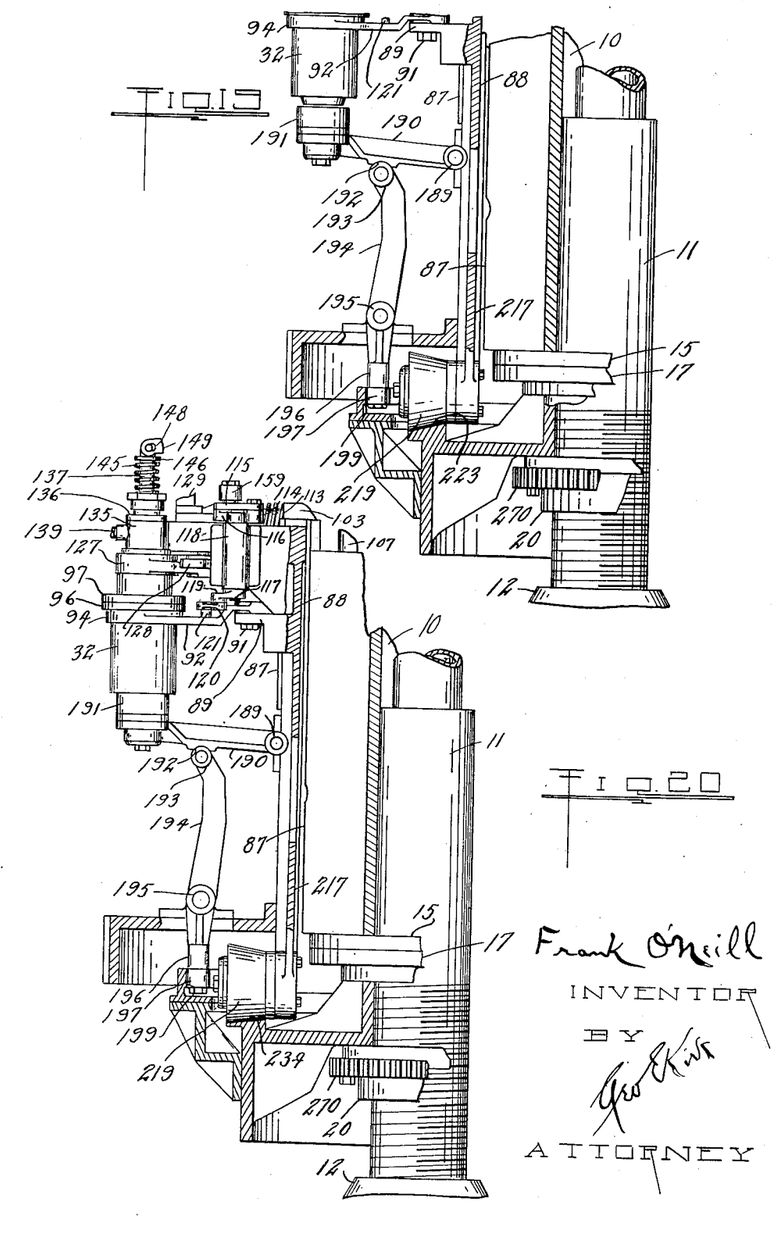
Fig. 19 is a fragmentary view of the blank mold and coacting parts of Station Two.
Fig. 20 is a view similar to Fig. 19 showing the blank mold as settled down into assembled position with the baffle or bottom closure.

Mounted with the guides 87 by pivot pin 189 (Figs. 2, 19, 20) is arm 190 carrying bottom closure 191 having on its lower side seat 192. Coacting with the under side of this arm to ride into this seat 192 is roller 193 mounted in bent arm 194 of lever having fulcrum bearing 195 in the carrier. This arm 194 has therefrom additional arm 196 forming therewith a lever. This arm 196 carries roller 197. The roller 197 of this lever 194, 196, as riding against cam 198, (Fig. 11) swings this lever 196, 194, on its fulcrum 195, to have the roller 193 ride along the under side of the arm 190 and swing such arm 190 on its bearing 189 to move this arm 190 into approximately horizontal position, and as here shown the arm 190 is raised a little above horizontal position and the roller 193 has come to rest in the seat 192, while the roller 197 rides along cam portion 199. This position for the bottom closure or baffle 191 is slightly below the normal travel position for the closed blank mold. From such operative position of the blank mold bottom closure, the roller 197 coacts with cam portion 200 for swinging the roller 193 out of the seat 192 and thus allowing the closure 191 to swing downward toward the crosshead 88 and away from the blank mold.

Blow mold bottom closure

Blow mold carrier table 167 is provided on its under side with brackets 201 having pivot pins 202 for radially extending arms 203 carrying bottom closures 204 (Figs. 2, 14, 16) for the blow mold sections 171 as in closed position. This arm 203 has pivot pin 205 from which depends link 206 carrying spring 207, as an adjustable thrust device in pivotal connection of such link by pin 208 with arm 209 mounted on fulcrum pin 210 carried by the blow table or carrier 22. This lever 209 has angle extension 211 carrying roller 212 coacting with cam having long radius portion 213 (Fig. 6) extending to short radius portion 214 having opposing cam patch 215 to effect pulling of the roller 212 radially inward and thereby swinging downward the bottom closure 204 as the blow mold sections 171 have been opened, this downward swinging being effective for discharging the finished article of ware from the machine. From these short radius portions 214, 215, there is increasing radius portion 216 effective through the yieldable connection 207 for throwing the blow mold bottom closure 204 into position horizontally, there to be engaged by the closing of the blow mold sections 171.

Blank mold table crosshead gather dip control

Figure 12:
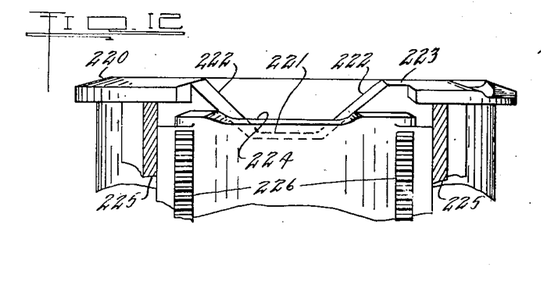
Fig. 12 is a section on the line XII—XII, Fig. 11 looking in the direction of the arrow.

The crossheads 88 have depending portions 217 (Figs. 2, 19, 20) carrying trunnions 218 for conical rollers 219 normally sustaining the crossheads 88 as such rollers 219 travel on track 220. This track 220 has inner major depression portion 221 in the region of the dip for the blank mold in obtaining the suction gather. This track (Figs. 11, 12) section 221 has portions 222 continuous with the track portion 220 and the track portion 223. Overlapping these dip track portions 221, 222, and peripherally therebeyond, is track section or portion 224 mounted as a crosshead in guides 225 fixed with the member 19 as carrying the main track regions 220 and 223. This section 224 has racks 226 depending therefrom. These racks 226 are engaged by pinions 227 on shaft 228 carrying worm wheel 229 as driven by worm 230 on shaft 231 as actuated by hand wheel 232. This device accordingly provides an adjustable dip control region operable while the machine is running to increase or lower the extent of dip of the blank mold as to the pool of molten glass in the forehearth 30. This device is self-locking in its adjustment due to the angle of friction of the speed reduction device herein shown as a worm and worm wheel.

Blank mold registry positioning with baffle

The track 223 has dip portion 233 to track portion 234. This dip portion 233 so lowers the closed blank mold sections 32, 33, as having the gather therein, to allow such sections to come into assembled position with the lifted baffle or bottom closure 190 as held by the lever arm 194 having its roller 193 (Figs. 1, 13, 19, 20) resting in the seat 192. From this position of baffle or bottom closure assembly, the closed blank molds 32, 33, may be lifted by the roller 219 riding on track section 235 to bring the crosshead for its circuit of riding on the track 220.

Pneumatic features-blank

Suction air line 236 extends to member 19, and thence by elongated port 237 in the member 17 to register (Figs. 2, 11) with respective ports 238, in the plate 15. In the travel of the blank carrier 9, this port 237 registers with ports 238 and ducts 239 from which extend flexible duct extensions 139 in communication with the head of the blank mold for effecting the suction action in the region of the suction gather. Pressure line 240 extends to the member 19 and thence by elongated port 241 in the member 17 to the port 238 in the supporting plate 15. In the continuation of the travel of the carrier 9, this port 238 is in communication with the port 241 at the region of the track 234 wherein the closed blank mold is in position with its baffle or bottom closure. Accordingly, there is at this position, an action upon the gather 243 to form extension air chamber 244 in this blank mold member and thus force the molten glass to fill the blank mold.

Blow

The pressure line 240 has branch 245 to the member 24 (Figs. 2, 6, 11) in communication by way of elongated port 246 in the plate 23 with duct 247 of the carrier 22 having flexible duct extension 248 to finish blow head 249 rockably mounted against washer 250 (Figs. 14, 15) in assembly with sleeve 251 by bolts 252. This sleeve 251 is carried by arm 253 mounted on pivot pin 254 carried by blow mold carrier upper table section 255 connected by the brackets 168 with the intermediate table section 167 of the blow mold carrier as mounted about the column 26. The port 246 controls the timing for the blowing of the pressure air by way of the duct 248 into the head 249, there bringing the loose member 256 to have its asbestos washer 257 in seating relation with the upper end or neck finish portion of the blank 243 in the region of the air chamber 244 therein.

The angular extent of the port 246 in the plate 23 determines the time interval of blowing at the rate of operation of the machine. The positioning of the blow head against the closed blow molds 171 is determined by spring 258 about pin 259 extending through slot 260 to have its head 261 therebelow. This pin 259 is in arm 262 pivotally mounted on bearing 263 mounted by the table 255 parallel with the bearing 254. Fixed with this arm 262 is arm 264 forming with the arm 262 an angle lever. This arm 264 carries roller 265. Fixed with the column 26 is cam 266 having portion 267 (Fig. 1) coacting to swing the roller 265 radially inward and thus have the head 261 coact with the arm 253 for lifting the blow head 249 clear of the blow molds 171. The blow head 249 is maintained lifted by cam portion 268 and at its shortening radius portion 269 approaches the transfer station. From this cam portion 269, there is increasing radius cam portion 269' directing this roller 265 radially outward, thereby causing through the spring 258 a yieldable holding action of the head 249 upon the closed blow mold comprising the sections 171. From this held closure position, the roller 265 rides upon cam portion 267.

Table height adjustment

Besides the mattter of dip at the blow table to take care of varying lifts of the glass in the tank or variations in the extent of dip desired for the closed blank mold as effecting the suction gather, there is provision for entire carriage adjustment axially of the column 11. This adjustment may take care of different lengths of blank molds for variations in the character of ware to be produced. To this end, the threaded member 20 on the column 11 has fixed therewith, worm wheel 270 (Figs. 2, 11) in mesh with worm 271 on shaft 272 carried by bearings 273 depending from the member 19. This shaft 272 extends to have hand wheel 274 as an operating means, so that by the rotation of this hand wheel, the member 19, as splined on the column 11, may be shifted longitudinally of such column 11 independently of rotation relatively thereto, and thus raise or lower the carrier 9 and the parts mounted thereby. In this operation, the threaded member 20 rotates on the column 11, while the member 19 is held by key 18 from such rotation, and its travel is limited to that of axially of the column 11. The worm wheel 270 and the worm 271 serve as a speed reduction self-locking drive so that at whatever adjustment the device is operated by the hand wheel 274, it may retain such position by the angle of friction locking thereof.

The adjustment of the table 8 in normal operations, requires a similar adjustment or some adjustment of the blow table 22 to care for such different type of ware to be produced. To this end, the member 28 as a threaded member may be adjusted on the column 26. Fixed with this threaded member 28 is worm wheel 275 in mesh with worm 276 on shaft 277 mounted in bearings 278 fixed with the member 24 as connected by spline 25 to move axially of the column 26 (Figs. 2, 6) independently of rotation relatively thereto. This shaft 277 is driven by hand wheel 278', and this worm speed reduction is an angle of friction lock for maintaining the table 22 in its adjusted vertical position. This table height adjustment may occur with the machine running.

Operation (Fig. 18)

At region 279, in the operation of the machine as driven by motor 1, effecting rotation of the table 9, the closed blank mold 32, 33, begins its descent on track portion 222 to the track portion 224 in its dip into the tank or in proximity with the surface 35 of molten glass as exposed by opening 31 in the top of the forehearth 30. In this driving operation, the suction port 237 in the plate 17 is in registry with the duct 239 so that there may be suction by way of the duct 139 for drawing the molten gather of glass into the blank mold. In this travel of the blank mold from the point 279 to the point 280, the descent is completed while in the travel from the point 280 to the point 281, there is sucking of the charge into the mold with the travel of this blank relatively to the molten glass in the pool. From the point 281 to the point 282, the track section 222 is operative for lifting the blank mold with its gather out of the opening 31 in the forehearth 30. In this lifting out, there is a trailing attenuation 83 which is engaged by shear blades 74, 76, by the travel of such shear toward the approaching blank mold and the severing of the attenuation 83, not only to cut such off from the gather in the blank, but to have the lower blade 76 throw such attenuation 83 laterally of the path of travel of the suction gather as to the pool. This lateral throwing (Fig. 9) is toward the main pool of the furnace back of the forehearth 30. This shearing operation is completed at point 283. The blank has cleared the forehearth opening 31 at point 284. The plunger 137 with its nipple 138 is released at point 285 by the roller 152 riding from the cam portion 154 to the cam portions 155, 156 while at this point 285, the port 237 is out of registry and the suction is then cut off. In this region, the cam 198 is effective to rock the baffle 191 by throwing the roller 193 into seat 192 so that such baffle 191 may be swung toward the blank mold 32, 33, which has the gather sucked up thereinto. The baffle 191 is still spaced from the closed blank mold. At point 286, the roller 219 rides on track section 233 and thus drops the blank mold into assembled position with this lifted baffle plate or bottom closure 191. From point 287 to point 288, the roller 219 travels on track section 234 and during this interval, the pressure air line 240 is in communication by way of port 241 to apply pressure air to the blank, and thus form the air chamber 244 in such blank as thrust out against the blank mold and completely formed blank. At point 288, the track section 235 lifts the closed blank 32, 33, clear of the baffle plate 191. This lifting of the blank is completed at point 289. From the point 288, the roller 197 rides upon cam section 200 and thus swings the roller 193 clear of the seat 192 to allow the blank bottom closure 191 to swing clear of the formed blank in the closed blank mold. This dropping of the baffle plate as effected by the cam 200 occurs between the point 289 and point 290. Between the point 290 and point 291, cam 108, 111, is effective on the roller 106 for opening the blank mold sections 32, 33. At point 292 the cam 163 is effective for shifting radially outward the crosshead 124 as carrying the neck finish from which depends the formed blank 243. From point 293 to point 294, the cam 164 directs the neck finish to travel concentrically of the column 26 and hold the plunger 249 in the blow mold 171 as approaching closed position. As the blow mold 171 closes about the suspended blank 243 therein, at point 295, the cam 134 has depressed the roller 133 to such extent that such is effective to release the neck mold sections 126, 127, at fully open position. The cam 134' at point 296 has allowed the springs 128, 133, to release and permit these neck mold sections 126, 127, to become fully closed, while at this point 296 the cam 165 has retracted the crosshead 124. The blank mold is still open. Cam portion 110 is effective in the region 296 to point 297 for closing the blank mold by moving the roller 106 radially outward. At point 297, cam 153 is effective for acting upon the roller 152 in depressing the plunger 137 to bring the nipple 138 into position for the suction gather to occur in a repetition of this cycle of operations on the blank table.

At point 298, as the blow molds 171 are traveling with the formed blank 143 therein, cam portion 188 is acting upon roller 184 in swinging these blow mold sections 171 into fully closed position at point 299. At point 300, the neck mold sections 126, 127, start to clear this blow mold and are clear at point 301, where the cam 269 is effective upon roller 265 for rocking the blow head 249 into yieldable contacting relation with the closed blow mold 171. At point 302, port 247 is in registry with the duct 248 for closing action in forming the article of blown ware from the blank as in the closed mold 171. At point 303, this blowing action is completed and the cam 267 causes the head 249 to be lifted therefrom. This lifting action is completed at point 304 at cam portion 268. At point 305 the cam portions 186, 187, are effective in acting upon roller 184 for opening the blow mold sections 171. At point 306, the blow mold is fully open and the roller 212 is riding upon cam portion 214 in causing the bottom closure 204 to move or swing downward from its rest position, thus to tilt completed blown article of ware 307 out of the machine at point 308, for conveyance, say to a lehr. At point 309, cam portion 188 starts to close the mold 171, while at point 308, the cam portion 216 is effective for swinging the bottom closure 204 back to be in position at point 310 in time for the blow mold to close thereabout.

In this operation of the machine, there is shown tables each having six molds thereon, and in this operation, these may be considered as stations, the sequence of which is numbered herewith.

What is claimed and it is desired to secure by United States Letters Patent is:—

1. A traveling carrier, an open bottom blank mold carried thereby, directing means providing a dip for the mold, a tank providing a pool of molten glass in proximity to the surface of which said dipped traveling mold may come, and means for adjusting the dip of the mold as to the carrier, said directing means comprising an endless guide way having a fixed dip portion, and a relatively adjustable dip portion operable by said adjusting means for restricting the extent of the effectiveness of the fixed dip portion.

2. A traveling carrier having a roller, an open bottom blank mold mounted by the carrier, directing means providing a dip for the mold, a tank providing a pool of molten glass in proximity to the surface of which said dipped traveling mold may come, and means for adjusting the dip of the mold as to the carrier and tank, said directing means comprising an endless track for the roller having a fixed dip portion and a relatively adjustable adjacent dip portion shiftable by said adjusting means for varying the extent of the effectiveness of the fixed dip portion.

3. A traveling carrier, an open bottom blank mold mounted thereby, directing means providing a dip for the mold, a tank providing a pool of molten glass in proximity to the surface of which said dipped traveling mold may come, suction means for drawing glass from the pool into the mold to leave an attenuation therefrom, severing means for the glass adjacent the mold as rising from the pool, a mounting for the severing means as to which the carrier travels with the mold, said severing means being effective for dropping the attenuation of glass from the pool back thereinto, a molten glass actuating paddle mounted independently of the carrier, a paddle support movable toward the pool to settle the paddle into the pool, and an actuator for the support and paddle for moving the molten glass in the pool to work the dropping back portion of the glass away from the region of the mold dipping.

4. A rotary carrier, an open bottom blank mold mounted thereby, directing means providing a dip for the mold, a tank providing a pool of molten glass in proximity to the surface of which said dipped traveling mold may come, suction means for drawing molten glass from the pool into the mold to leave an attenuation therefrom extending back toward the pool, a shear for severing said attenuation adjacent the mold and throwing such to one side of said attenuation extent, a mounting for the shear as to which the carrier travels with the mold, a molten glass actuating paddle mounted independently of the carrier, a paddle support movable toward the pool to settle the paddle into the pool, and an actuator for the support and paddle for moving the severed attenuation still further away from the region of its formation.

5. A rotary carrier, an open bottom blank mold mounted thereby, directing means providing a dip for the mold, a tank providing a pool of molten glass in proximity to the surface of which said dipped traveling mold may come, a bottom closure for the mold, an actuator for the closure as the mold has left the tank for bringing the closure toward the mold with clearance relatively to the mold, and supplemental mold shifting means for bringing the mold through said clearance into assembled position with said closure.

6. A rotary carrier, an open bottom blank mold mounted thereby, directing means providing a dip for the mold, a tank providing a pool of molten glass in proximity to the surface of which said dipped traveling mold may come, a shear for clearing the gather of glass in the mold from connection with glass in the tank, a bottom closure for the mold in addition to said shear, closure mounting means positioning said closure by movement relatively to said shear to oppose the mold, and supplemental mold dipping means for bringing the mold into assembled position with said closure.

7. A blank mold, a rotary carrier therefor, a blow mold, a rotary carrier therefor, driving means for rotating said carriers to bring said molds into proximity, and a transfer device for an article from the blank mold and mounted on one of said carriers and provided with directing means radially actuating the device relatively to the blank mold carrier and then in an arc coaxial with the blow mold carrier as said molds are brought into proximity.

8. A blank mold, a rotary carrier therefor, a blow mold, a rotary carrier therefor, driving means for rotating said carriers to bring said molds into proximity, a transfer device mounted on the blank mold carrier for shifting an article from the blank mold, and control means for said device effecting directing thereof radially as to the blank mold carrier and thereafter in an arc coaxial with the blow mold carrier.

9. A rotary carrier, an annular series of vertical guides coaxial with said carrier, a crosshead in each guide, an annular fixed continuous track coaxial with the carrier for determining independent shifting of said crossheads axially of said carrier along said guides, and an adjustable fractional section coaxial with and adjacent to the annular track for varying said axial shifting of the carriers by restricting the portion of the continuous track co-operating with said carrier.

10. A rotary carrier, guides in an annular series concentric of said carrier, crossheads in said guides shiftable axially of the carrier, a first track about the carrier for determining independent shifting of the crossheads, and a second track section peripherally overlapping portions of said first track and adjustable relatively to the carrier and first track for varying said shifting of the crossheads.

11. A carrier, a threaded column for fixing the axis of rotation of said carrier, an annular series of molds mounted on the carrier, a support for the carrier threaded on the column and as to which support the carrier is movable, a plate between the support and carrier, and self-locking rotatable means mounted by the plate independently of the carrier and having its axis extending laterally of the column, said means being operable for adjusting said support for thereby varying the position of the carrier axially of said column.

12. A rotary carrier, an annular series of molds mounted thereby, upper closure means for each mold, a column about which the carrier is mounted, a ring-shaped ported plate providing a bearing supporting the carrier and coaxial with the carrier, means for adjusting the plate as to the column, and duct means from said plate to said respective closures.

13. A threaded column, a rotary carrier thereon, an annular series of molds mounted on the carrier, upper closure means for each mold, a ring-shaped ported plate about the column and coaxial with the carrier, a nut threaded on the column, supporting the plate and rotatable for shifting the plate and carrier axially of the column, and duct means from said plate to said respective closures.

14. A rotary carrier providing an annular series of axially extending guides providing parallel clearance regions therebetween, crossheads in said guides, molds carried by said crossheads, upper closure means for each mold, a ported plate for the carrier, ducts from said plate extending between said crossheads at said parallel clearance regions, and extension flexible ducts from the ducts to the respective closures.

15. A rotary carrier, an annular series of molds mounted thereby, upper closure means for each mold, a ported supporting plate for the carrier, a bearing for said plate to which said plate is keyed, a suction duct communicating with one of said plate ports, a pressure duct communicating with another of said plate ports, and a carrier mounted duct from each closure for in sequence successively being connected through said plate with said suction and pressure ports.

16. A traveling carrier, a mold mounted thereby, a pool of molten glass having an exposed upper surface, control means for causing the mold to remove a gather of glass from the pool, severing means for the gather adjacent the mold, a mounting for the severing means as to which the carrier travels with the mold, and means for withdrawing molten glass in the pool away from the direction of travel of the carrier, said means including a depending paddle and paddle mounting means movable toward and from the pool to submerge and remove the depending paddle from the pool.

17. A traveling carrier, a mold mounted thereby to have a path, a pool of molten glass having exposed upper surface in said path, suction means for transferring from the pool a gather of glass for the mold, severing means for the gather adjacent the mold, a mounting for the severing means as to which the carrier travels with the mold, and means disposed laterally of said path for withdrawing molten glass from said path, said means including a depending paddle and paddle mounting means movable toward and from the pool to submerge and remove the depending paddle from the pool.

18. A rotary carrier, a mold mounted thereby to have a circular path, a pool of molten glass having an exposed upper surface in said path, control means for causing said mold to be charged with a gather from said pool during mold travel in said path, severing means for the gather adjacent the mold, a mounting for the severing means as to which the carrier travels with the mold, and means for withdrawing molten glass in the pool from said path, said means being operable eccentrically of said path, said means including a depending paddle and paddle mounting means movable toward and from the pool to submerge and remove the depending paddle from the pool.

19. A mold, a pool of molten glass having an exposed surface, a traveling carrier for the mold as to said pool, control means therefor for charging the mold with a gather as describing a path as to said surface, severing means for the gather adjacent the mold, a mounting for the severing means as to which the carrier travels with the mold, and means for withdrawing molten glass from said path embodying a paddle operable laterally of said path and paddle mounting means movable toward and from the pool to submerge and remove the paddle from the pool.

20. A mold, a pool of molten glass having an exposed surface path for mold travel thereacross, control means for charging the mold with a gather of molten glass from the pool, severing means for the gather adjacent the mold, a mounting for the severing means as to which the carrier travels with the mold, a molten glass actuating paddle, a mounting for the paddle, and a rotary drive for lifting the paddle mounting away from the pool in one direction of paddle movement out of the pool and settling said paddle mounting toward the pool for the other direction of paddle movement in the pool in generating a flow of molten glass from said path.

21. A rotary carrier, a pair of blank mold sections hinged thereon to swing into mold closing position, a pair of neck finish mold sections independently swingable to closed position over said closed blank mold sections, a crosshead mounting said neck finish sections, a radially extending guide for said crosshead, and a stationary cam controlling radial shifting of said crosshead carried neck finish mold sections relatively to the blank mold sections.

22. A rotary carrier provided with a radially extending guide, a crosshead in said guide, a mold section carried thereby, a second rotary carrier laterally of said first carrier having a station, means rotating said carriers simultaneously, and a fixed cam for controlling said crosshead having an intermediate portion coaxial with said second carrier for registering said mold section with said station.

23. A rotary carrier provided with a radially extending guide, a crosshead in said guide, a neck finish sectional mold carried thereby, a second rotary carrier laterally of said first carrier and having a blow mold, means rotating said carriers simultaneously, and a fixed cam for controlling said crosshead having terminal portions for effecting radial shifting of the crosshead as to the first carrier and an intermediate portion concentric with the second carrier for registering said neck finish section mold with said blow mold.

24. A rotary carrier provided with a radially extending guide, a crosshead in said guide, a neck finish sectional mold carried thereby, a second rotary carrier laterally of said first carrier and having a blow mold, means rotating said carriers simultaneously, and a fixed cam for controlling said crosshead having terminal portions for effecting radial shifting of the crosshead as to the first carrier and an intermediate portion concentric with the second carrier for registering said neck finish section mold with said blow mold, and means for opening said neck finish sectional mold as registering with said blow mold.

25. A rotary carrier provided with an open bottom mold, a bottom closure therefor, a pivotally mounted arm carrying said closure, said arm having a way therealong to a seat, a roller actuator movable along said arm way into said seat for bringing the closure toward said mold, and a cam as to which the carrier is rotatable for engaging and thereby operating said actuator for causing the carrier travel to shift said closure.

26. A rotary carrier provided with an open bottom mold, a bottom closure therefor, a pivotally mounted arm carrying said closure, a roller, an angle lever mounting for the roller, a fixed cam as to which the carrier is rotatable for rendering carrier rotation effective for swinging the lever to cause the roller to ride along the arm in shifting the closure toward said mold.

27. A rotary carrier provided with an open bottom mold, suction means for drawing a gather of glass into said mold, a shear mounted independently of the carrier toward which shear the mold is movable, a drive for causing the carrier to move the mold in a circular path toward the shear, and an actuator for simultaneously shifting the shear approximately tangentially of the mold travel path toward the mold and closing said shear.

28. Traveling means for effecting a gather of glass said means having a circular path, a shear toward which the means is movable after effecting a gather of glass before severing of the glass occurs, and an actuator for simultaneously shifting the shear toward the means and closing said shear as the means passes above the path of the shear.

29. Traveling means for effecting a gather of glass, said means having a circular path, a shear toward which the means is movable after effecting a gather of glass before severing of the glass occurs, a crosshead for carrying the shear, a guide for said crosshead extending toward said means, and an actuator for the crosshead along said guide as the means passes above the path of the shear.

30. Traveling means for effecting a gather of glass, a shear toward which the means is movable, a crosshead for carrying the shear, a guide for said crosshead extending toward said means and terminating in a different width portion, and an actuator for the crosshead along said guide to said different width portion to be thereby given shearing operation.

31. A first rotary carrier provided with a guide, a crosshead in said guide, a mold section carried thereby, a second rotary carrier laterally of said first carrier and having a region of proximity to said first carrier, means for rotating said carriers simultaneously, and control means for said crosshead providing at said region of proximity an arc of travel concentric with the second carrier for registering said mold section with said region while said carriers are being rotated.

32. A rotary carrier provided with an open bottom mold, a bottom closure therefor, a swingable arm mounting said closure, a strut shiftable under said arm to lift the arm and hold it in position toward said mold and a cam as to which said carrier is movable and rendered effective by said carrier rotation to shift said strut.

33. A rotary carrier, a crosshead mounted thereby, an open bottom mold carried by the crosshead, a bottom closure for the mold, a swingable arm mounting said closure, a strut shiftable under said arm to lift the arm and hold it in position toward said mold and a cam as to which said carrier is movable and rendered effective by said carrier rotation to shift said strut.

34. A traveling carrier, an open bottom blank mold mounted thereby to have a circular path, directing means providing a dip for the mold, a tank providing a pool of molten glass in proximity to the surface of which said dipped traveling mold may come, suction means for drawing glass from the pool into the mold to leave an attenuation therefrom, severing means for the glass adjacent the mold as rising from the pool, and a mounting for the severing means toward which mounting the attenuation is drawn by the movement of the carrier, said severing means being effective for dropping the attenuation of glass from the pool back thereinto.

35. A rotary carrier, an annular series of open bottom blank molds mounted thereby, a charging station having a pool of molten glass providing an exposed surface from which gathers are lifted into the molds, driving means for the carrier for shifting the molds to pass the charging station for pulling an attenuation of glass from the respective molds from the pool, a shear common to the annular series of molds and movable theretoward to effect a severing of the attenuation to fall back into the pool, and a mounting for the shear toward which mounting the attenuation is drawn by the mold movement with the carrier away from the charging station.

36. A carrier, a pair of mold sections thereon movable to closed position, said closed mold having an open bottom mold, a bottom closure therefor, an arm pivoted to the under side of said carrier and mounting said closure independently of said mold, a link connected to said arm, and a control for said link moved relatively to said arm by movement of the carrier.

37. A carrier provided with an open bottom mold, a bottom closure therefor, a swingable arm mounting said closure, a yieldable link for thrusting said arm toward said mold, and a lever connected to said link and rendered effective for shifting the arm by movement of the carrier.

38. A column, a rotary carrier thereon, an annular series of molds mounted on the carrier, a support on the column for the carrier, a drive for rotating the carrier on the column as to the column and support, rotary means extending tangentially of and away from the support and a mounting for the rotary means held against rotation as to the column and as to which mounting the support is movable for adjusting said support for thereby varying the position of the carrier axially of said column during rotation of the carrier by said drive.

39. A traveling carrier, an actuator for the carrier, an open bottom blank mold carried thereby, endless directing means providing a dip for the mold, a tank providing a pool of molten glass in proximity to the surface of which said dipped traveling mold may come, a control for limiting the extent of the effectiveness of the endless directing means for varying the dip of said mold toward the pool, and means for adjusting said control relatively to the endless directing means when the actuator is operating the carrier.

40. A blank mold, a rotary carrier therefor maintaining said mold at all times in upright position, a blow mold, a rotary carrier therefor, driving means for rotating said carriers on vertical axes to bring said molds into proximity, and a transfer device for an article from the blank mold and mounted on one of said carriers and provided with stationary directing means mounted independently of the carrier for radially actuating the device relatively to the blank mold carrier and then to shift with the blow mold carrier as said molds are brought into proximity.

41. A blank mold, a rotary carrier therefor maintaining said mold at all times in upright position, a blow mold, a rotary carrier therefor, driving means for rotating said carriers on vertical axes to bring said molds into proximity, a transfer device mounted on the blank mold carrier for shifting an article from the blank mold, and stationary control means for said device effecting directing thereof radially as to the blank mold carrier and thereafter to shift with the blow mold carrier.

42. A glassware forming machine comprising a truck, a pair of spaced parallel columns rising from the truck, a gear on each column, one meshing with the other, a plurality of suction gather blank formers in an annular series rotatable with one of said gears, control means effecting dipping in sequence of the formers into suction gathering position, bottom shear and former bottom closing means for the former, said formers including independently operable neck finish members remote from the bottom closing means, actuating means for removing the closing means from the formers, then opening the formers, and thereafter opening the neck finish members, sectional blow molds in an annular series rotatable with the other gear, and means operable during gear rotation and effective in the vicinity of the meshing of the gears for bringing the closing blow molds in sequence into embracing position about a simultaneously traveling glass blank suspended by a pair of neck finish members, said actuating means opening said members before the members reach aligned position between said columns.

43. A glassware forming machine comprising a truck, a pair of spaced parallel columns rising from the truck, a gear on each column, one meshing with the other, a plurality of blank formers in an annular series rotatable with one of said gears, said formers including independently openable neck-finish members, sectional blow molds in an annular series rotatable with the other gear in meshing sequence cooperation with the open formers, said neck finish members being thereabove at the vicinity of the meshing of the gears, and actuating means opening the members and closing the sectional blow mold while approaching the vicinity of the mean meshing relation between the gears.

44. A first rotary carrier provided with a guide, a crosshead in said guide, a mold section carried by the crosshead and maintained at all times by said carrier in upright position, a second rotary carrier laterally of said first carrier and having a region of proximity to said first carrier, a mold on said carrier, means for continuously rotating said carriers simultaneously on parallel vertical axes, and control means for said crosshead operable by a carrier rotation and at said region of proximity directing a mold section from movement radially relatively to one carrier for travel in transferable alignment with the mold on the other carrier while said carriers are being rotated, said means coacting for controlling and directing the radially shifted mold in a repetition of the cycle of operations, there being additional mold opening and closing control means timed with said mold directing control means for releasing an article from one mold and engaging said article into the other mold.

45. A first traveling carrier, blank and neck finish mold sections therefor maintained at all times by said carrier in upright position, a second relatively traveling carrier laterally of said first carrier, a blow mold mounted on the second carrier, said second carrier having a station for the blow mold to be moved into a region of proximity as to said first carrier, means for continuously rotating said carriers on parallel vertical axes, and a neck finish transfer device operable by a carrier rotation and having a cycle of operation including means radially outwardly shifting said neck finish sections for travel in approximate axial alignment over molds of the other carrier during rotation of said second carrier, there being mold opening and closing means timed with said neck shifting means for releasing an article from the neck finish sections to be engaged by the blow mold.

46. A pair of rotary carriers, one laterally eccentric of the other, mold sections on the respective carriers maintained at all times by said carriers in upright position, means for continuously rotating the carriers, and a mold section shifting transfer device operable by a carrier rotation and having a cycle of operation including means radially outwardly movable from one carrier for travel in approximate axial alignment over a mold on the other carrier during the rotation of said carriers, there being mold opening and closing control means timed with said radially movable means for releasing an article from a mold on one carrier to be engaged by the mold on the other carrier.

47. A carrier, a gather device mounted by the carrier to have a path of travel, and a tank providing a pool of molten glass in proximity to the surface of which said device may travel, means effecting said travel in a continuous lineal glass-withdrawing path as to the pool surface, said tank marginally of said path having overhanging shield means, said carrier having vertical shifting means for the gather device to pass in said path over the shield means to the pool from one side of the tank and out of the pool from the other side of the tank while said continuous travel means is effective.

48. A carrier, a gather device mounted by the carrier to have a path of travel, and a tank providing a pool of molten glass in proximity to the surface of which said device may travel, means effecting said travel in a continuous lineal withdrawing path as to the pool surface, said tank having an exposed upper surface in the line of said path and provided with opposing ledges overhanging toward said path, said carrier having vertical shifting means for the gather device in said path to pass over the tank to the pool between the ledges and therefrom over the tank away from the pool while said travel means is effective.

49. In combination with a supply of molten glass, a fabricating machine for glassware comprising a continuously rotating suction parison mold carrier adapted to rotate about one center, a suction gathering parison mold mounted thereon, a blow mold carrier adapted to rotate about a second center, a blow mold mounted thereon, means for moving said parison mold relative to said carrier successively into gathering, parison forming, and transfer positions, means for creating a vacuum within the parison mold to gather glass charges therein, means for further shaping into completed parisons the charges so collected, and means for transferring the parisons so formed to the blow mold while the carriers rotate about their respective centers.

50. A glass forming machine comprising a carrier, a parison forming unit mounted on said carrier, a second carrier, a finishing mold thereon, means for supplying glass to the parison forming unit and to shape such glass into a parison in said unit, a parison supporting and transfer device associated with said machine, means for rotating said carriers continuously, whereby said parison forming unit and finishing mold are moved in about the same direction through a transfer zone, means for opening the parison mold during the movement thereof toward said transfer zone to leave the parison supported by said transfer device, means for actuating said transfer device to move the parison in a path to approach and recede from the path of the finishing mold at spaced points, means for partially closing the finishing mold about the parison at one of said points, and for thereafter completely closing the finishing mold prior to passing the other point, and means for releasing the parison from said transfer device into the finishing mold.

51. In combination with a supply of molten glass, a two-table suction gathering glassware fabricating machine, comprising a parison mold, neck ring and suction head mounted on one table for rotation about the center thereof, and a blow mold mounted on a second table for rotation about the center thereof, a gear fixed with each table; said gears directly meshing for controlling rotation of the tables, means for gathering a charge of glass by suction in said parison mold and neck ring, means for further shaping the charge into a complete parison therein, means for opening the parison mold, leaving the parison suspended from the closed neck ring, means for moving the parison while so suspended into the path of the center line of the blow mold, means for closing the blow mold about the parison, means for opening the neck ring, and means for blowing the parison into final form in the blow mold.

52. In combination with a supply of molten glass, a fabricating machine for glassware comprising a continuously rotating suction parison mold carrier adapted to rotate about one center, a suction gather parison mold mounted thereon, a blow mold carrier adapted to rotate about a second center, there being relative rotation cooperating means fixed with the respective carriers and in direct engagement therebetween, a blow mold mounted thereon, means for moving said parison mold relative to said carrier successively into gathering, parison forming, and transfer positions, means for creating a vacuum within the parison mold to gather glass charges therein, means for further shaping into completed parisons the charges so collected, and means for transferring the parisons so formed to the blow mold while the carriers rotate about their respective centers.

53. A glass forming machine comprising a carrier, a parison forming unit including a body mold and a neck mold on said carrier, a finishing mold carrier, a finishing mold thereon, a gear fixed with each carrier, said gears directly meshing one with the other for controlling the carriers for continuous rotation of said carriers in opposite directions, whereby the molds thereon are caused to travel in closed paths about the axes of their respective carriers, and the neck mold and finishing mold are caused to travel in about the same direction while moving through a transfer zone, means for controlling said neck and finishing mold throughout the transfer zone to come substantially into axial alignment adjacent the line of centers of the carriers, means for supplying glass to the parison forming unit to form a parison therein, means for holding the neck mold and body mold in neck-up position prior to the arrival thereof in the transfer zone, automatic means for opening the parison body mold during the movement of the unit toward the transfer zone, to leave a parison suspended from the neck mold, the described travel of the neck mold and previously opened finishing mold causing the suspended parison to be moved into a position to be enclosed by the finishing mold, automatic means for closing the finishing mold about the parison, and automatic means for opening the neck mold to release the parison to the blow mold prior to the initiation of blowing pressure therein and to permit the neck mold to be carried away from the finishing mold with the parison forming unit.

54. A glass forming machine comprising a carrier, a parison forming unit including a body mold and a neck mold mounted on said carrier, means for holding the neck mold above the plane of the top of the body mold at all times, a finishing mold carrier, a finishing mold thereon, positive angular control means rigid with the respective carriers and directly between the carriers for continuously rotating said carriers in opposite directions whereby the molds travel in annular paths and the neck mold and finishing mold are moved with their respective carriers in about the same direction through a transfer zone, means operative while the neck and finishing molds are so moving for holding them in predetermined positions relative to their tables and substantially in axial alignment while crossing the line of centers of the carriers, means for moving the parison forming unit vertically relative to its carrier to dip said unit into contact with a pool of molten glass to charge said unit with glass by suction, and to form the glass into a parison in said unit, automatic means for opening the parison body mold during the movement of the unit toward the transfer zone, to leave the parison suspended from the neck mold, the travel of the neck mold and previously opened finishing mold causing the suspended parison to be moved into a position to be enclosed by the finishing mold, automatic means for closing the finishing mold about the parison, and automatic means for opening the neck mold to release the parison to the finishing mold prior to blowing the parison in the finishing mold and to permit the neck mold to be carried away from the finishing mold with the parison forming unit.

55. In a glass forming apparatus, a carrier mounted for rotation about a vertical axis, a vertically movable supporting frame, means connecting said frame with said carrier, glass gathering and parison forming mechanism carried by said movably mounted frame for movement past a gathering station at a pool of molten glass and a parison transfer station as said carrier rotates, a stationary cam, adjustable motion transmitting mechanism carried by said carrier cooperating with said cam and with said vertically movable frame to cause said glass gathering and parison forming mechanism to dip to the surface of the gathering pool at said gathering station and to be raised from said gathering pool after a glass gathering operation, a second stationary cam, and adjustable means cooperating with said second-named cam and with said vertically movable frame for regulably controlling the low position of said glass gathering and parison forming unit when the latter is at said parison transfer station.

FRANK O'NEILL.

CERTIFICATE OF CORRECTION.

Patent No. 1,992,963. March 5, 1935.

FRANK O'NEILL.

It is hereby certified that error appears in the printed specification of the above numbered patent requiring correction as follows: Page 9, first column, line 29, claim 36, strike out the word "mold"; second column, line 21, claim 42, for "operable" read openable; and line 56, claim 44, after "said" insert the word second; and page 10, first column, line 55, before "travel" insert the word continuous; and that the said Letters Patent should be read with these corrections therein that the same may conform to the record of the case in the Patent Office.

Signed and sealed this 9th day of April, A. D. 1935.

Leslie Frazer (Seal) Acting Commissioner of Patents.